United States Patent
Niessner

(10) Patent No.: US 10,875,995 B2
(45) Date of Patent: Dec. 29, 2020

(54) ACRYLIC ESTER-STYRENE-ACRYLONITRILE COPOLYMER MOLDING MASSES HAVING OPTIMIZED RESIDUAL MONOMER FRACTION

(71) Applicant: INEOS STYROLUTION GROUP GMBH, Frankfurt am Main (DE)

(72) Inventor: Norbert Niessner, Friedelsheim (DE)

(73) Assignee: INEOS STYROLUTION GROUP GMBH, Frankfurt am Main (DE)

(*) Notice: Subject to any disclaimer, the term of this patent is extended or adjusted under 35 U.S.C. 154(b) by 21 days.

(21) Appl. No.: 16/301,551

(22) PCT Filed: May 15, 2017

(86) PCT No.: PCT/EP2017/061571
§ 371 (c)(1),
(2) Date: Nov. 14, 2018

(87) PCT Pub. No.: WO2017/198593
PCT Pub. Date: Nov. 23, 2017

(65) Prior Publication Data
US 2019/0203025 A1    Jul. 4, 2019

(30) Foreign Application Priority Data

May 20, 2016  (EP) .................................. 16170533

(51) Int. Cl.
*C08L 25/12* (2006.01)
*C08L 51/04* (2006.01)
*C08F 265/04* (2006.01)
*C08F 212/10* (2006.01)
*C08F 2/22* (2006.01)

(52) U.S. Cl.
CPC ............ *C08L 25/12* (2013.01); *C08F 212/10* (2013.01); *C08F 265/04* (2013.01); *C08L 51/04* (2013.01); *C08F 2/22* (2013.01); *C08F 2800/20* (2013.01); *C08L 2207/04* (2013.01); *C08L 2207/53* (2013.01)

(58) Field of Classification Search
CPC ................. C08L 51/04; C08L 25/12
See application file for complete search history.

(56) References Cited

U.S. PATENT DOCUMENTS

| 4,215,024 A | * | 7/1980 | Gomez .................... C08K 5/09 524/310 |
|---|---|---|---|
| 4,224,419 A | | 9/1980 | Swoboda et al. |
| 4,605,699 A | | 8/1986 | Mitulla et al. |
| 4,634,734 A | | 1/1987 | Hambrecht et al. |
| 4,788,253 A | | 11/1988 | Hambrecht et al. |
| 5,196,480 A | | 3/1993 | Seitz et al. |
| 5,837,772 A | * | 11/1998 | McKee ................. C08F 265/04 525/66 |
| 5,912,305 A | | 6/1999 | McKee et al. |
| 6,498,232 B1 | * | 12/2002 | Guntherberg ........... B29B 15/04 528/502 R |
| 2003/0181583 A1 | | 9/2003 | Duijzings et al. |
| 2004/0006178 A1 | | 1/2004 | Nagahara et al. |
| 2018/0179315 A1 | | 6/2018 | Walker et al. |

FOREIGN PATENT DOCUMENTS

| DE | 1260135 B | 2/1968 |
|---|---|---|
| DE | 2826925 A1 | 1/1980 |
| DE | 3149357 A1 | 6/1983 |
| DE | 3149358 A1 | 6/1983 |
| DE | 3227555 A1 | 1/1984 |
| DE | 3414118 A1 | 10/1985 |
| EP | 0363608 A1 | 4/1990 |
| EP | 0534212 A1 | 3/1993 |
| EP | 0535456 A1 | 4/1993 |
| EP | 0587018 A2 | 3/1994 |
| EP | 0733678 A1 | 3/1996 |
| GB | 1124911 A | 8/1968 |
| GB | 1472195 A | 5/1977 |
| WO | 95/22570 A1 | 8/1995 |
| WO | 99/37700 A1 | 7/1999 |
| WO | 02/10222 A1 | 2/2002 |
| WO | 2015/165810 A1 | 11/2015 |

* cited by examiner

*Primary Examiner* — Mark S Kaucher
(74) *Attorney, Agent, or Firm* — J.A. Lindeman & Co. PLLC

(57) ABSTRACT

Thermoplastic molding masses containing, with respect to the sum of the components A to D: a) 20 to 90 wt % of one or more styrene copolymers as component A, constructed from styrene and at least 30 wt % of acrylonitrile, b) 10 to 80 wt % of one or more impact-modified graft rubbers without olefinic double bond in the rubber phase as component B, constructed from graft base B1 and acrylonitrile-containing graft shell B2, c) 0 to 20 wt % of a polymer C different from the components A and B, and d) 0 to 15 wt % of additive D, wherein the difference in the acrylonitrile content of component A and graft shell B2 is at least 5 units and at most 10 units, have a residual monomer fraction of acrylonitrile of less than 100 ppm.

17 Claims, No Drawings

ACRYLIC ESTER-STYRENE-ACRYLONITRILE COPOLYMER MOLDING MASSES HAVING OPTIMIZED RESIDUAL MONOMER FRACTION

The present invention relates to a thermoplastic molding composition with reduced residual monomer content, and also to a process for the production of said thermoplastic molding composition. Specifically in the field of food applications or toy applications, producers are concerned with minimizing residual monomer content, in particular acrylonitrile content, preferably to less than the threshold of 80 ppm, based on the molding composition.

During the production of acrylate-styrene-acrylonitrile copolymers (ASA), most of the residual acrylonitrile (AN) monomer content is introduced by way of the emulsion polymerization of styrene-acrylonitrile (SAN) onto a cross-linked acrylate rubber.

WO 95/22570 describes a process for the production of an acrylonitrile-butadiene-styrene polymer (ABS) where a small-particle rubber latex is produced in emulsion and partially agglomerated, and the bimodal rubber latex is grafted in emulsion with styrene-acrylonitrile copolymers (SAN). The graft polymer is isolated from the aqueous phase and mixed in the melt with an SAN matrix polymer, where SAN graft shell and SAN matrix differ in their acrylonitrile content by no more than 6% by weight. No reduction of residual acrylonitrile monomer content is described.

The object is to reduce acrylonitrile content in the graft shell of the graft component of the thermoplastic molding composition to an extent such that, when comparison is made with a matched acrylonitrile content, residual monomer content is reduced by at least 5%, preferably 10%, without any noticeable impairment of the mechanical properties of the thermoplastic polymer product. In the case of a matched acrylonitrile content, S/AN of the matrix A and S/AN of the graft shell B2 have identical acrylonitrile content.

Surprisingly, it has been found that said object is achieved via the use of thermoplastic molding compositions, preferably of acrylate-styrene-acrylonitrile copolymers (ASA) where the difference between the acrylonitrile content of the matrix component A and of the graft shell B2 is at least 5 units and at most 10 units (% by weight). The residual acrylonitrile monomer content of the corresponding thermoplastic molding compositions is smaller than 100 ppm, preferably smaller than 80 ppm, in particular from 1 to 60 ppm, often smaller than 50 ppm, based on the molding composition.

One aspect of the present invention therefore provides a thermoplastic molding composition comprising, based on the entirety of components A to D:
a) from 20 to 90% by weight of one or more styrene copolymers as component A, composed of styrene (in particular at least 60% by weight) and at least 30% by weight of acrylonitrile, based on component A,
b) from 10 to 80% by weight of one or more impact-modifying graft rubbers having no olefinic double bond in the rubber phase as component B, composed of at least one graft base B1 and of at least one acrylonitrile-containing graft shell B2,
c) from 0 to 20% by weight of a polymer as component C different from components A and B, and
d) from 0 to 15% by weight of additive, often from 0.1 to 5% by weight, as component D, where the difference between the acrylonitrile content of component A and of graft shell B2 is at least 5 units (% by weight) and at most 10 units, and where the residual acrylonitrile monomer content in the thermoplastic molding composition is smaller than 100 ppm, preferably smaller than 80 ppm, in particular smaller than 75 ppm, often from 1 to 60 ppm, in particular from 1 to 49 ppm.

In another embodiment, the invention provides a thermoplastic molding composition as described above in which component A is a stryrene-acrylonitrile copolymer and/or a α-methylstyrene-acrylonitrile copolymer and the residual acrylonitrile monomer content in the thermoplastic molding composition is smaller than 75 ppm, often smaller than 50 ppm.

In another embodiment, the invention provides a thermoplastic molding composition as described above where component A is a styrene-acrylonitrile copolymer with from 30 to 35% by weight acrylonitrile content and from 65 to 70% by weight styrene content.

In another embodiment, the invention provides a thermoplastic molding composition as described above where component B is composed of:
b1) from 55 to 80% by weight, in particular from 55 to 65% by weight, of a particulate graft base B1 with glass transition temperature below 0° C., and
b2) from 20 to 45% by weight, in particular from 35 to 45% by weight, of a graft shell B2.

In another embodiment, the invention provides a thermoplastic molding composition as described above where graft base (component B1) is composed of:
b11) from 80 to 99.9% by weight of at least one C1-8-alkyl ester of acrylic acid, preferably C4-8 alkyl acrylates, in particular n-butyl acrylate and/or 2-ethylhexyl acrylate, as component B-11,
b12) from 0.1 to 5% by weight of at least one polyfunctional crosslinking monomer from the group of butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate and/or dihydrodicyclopentadienyl acrylate as component B-12, and optionally
b13) from 0 to 19.9% by weight of monomers from the following group: vinyl acetate, (meth)acrylonitrile, styrene, methylstyrene, methyl methacrylate and vinyl ether, as component B-13.

In another embodiment, the invention provides a thermoplastic molding composition as described above where the graft shell (component B2) is composed of:
b21) from 65 to 85% by weight of an aromatic monomer from the following group: styrene or α-methylstyrene as component B-21, and
b22) from 15 to 35% by weight of acrylonitrile as component B-22.

In another embodiment, the invention provides a thermoplastic molding composition as described above, consisting of:
a) from 30 to 85% by weight of component A,
b) from 14.9 to 69.9% by weight of component B,
c) from 0 to 15% by weight of component C, and
d) from 0 to 5% by weight, often from 0.1 to 5% by weight, of component D.

In another embodiment, the invention provides a thermoplastic molding composition as described above where the residual monomer content is smaller by at least 5% than in thermoplastic molding compositions which have identical acrylonitrile content in components A and B2.

In another embodiment, the invention provides a thermoplastic molding composition as described above where the residual monomer content is smaller by at least 10% than in thermoplastic molding compositions which have identical acrylonitrile content in components A and B2.

In another embodiment, the invention provides a thermoplastic molding composition as described above where the median particle diameter of component B is from 0.05 to 1.5 µm. The component is often bimodal.

In another embodiment, the invention provides a thermoplastic molding composition as described above where the median particle diameter of component B is from 1.6 to 20 µm.

Another aspect of the present invention provides a process for the production of a thermoplastic molding composition as described above, comprising the following steps:
i) mixing of components A and B, and optionally of component(s) C and/or D,
ii) compounding of the components mixed in step i), and
iii) cooling and optionally further process steps.

Another aspect of the present invention provides the use of a thermoplastic molding composition as described above, or thermoplastic composition produced as described above, for the production of moldings, films or coatings.

Component A

The thermoplastic molding composition comprises at least 20% by weight, generally at least 30% by weight, based on the total weight of the thermoplastic molding composition, of styrene copolymer(s) as component A (also termed hard matrix A). The quantity present of the styrene copolymers in the thermoplastic molding composition is from 20 to 90% by weight, preferably from 30 to 85% by weight, often from 35 to 80% by weight and in particular from 40 to 75% by weight, based on the entirety of components A to D.

The thermoplastic molding composition of the invention comprises one or more styrene copolymers as component A. Any suitable comonomers can be present alongside styrene in the copolymers here. Preference is given here to a styrene-acrylonitrile copolymer or an alpha-methylstyrene-acrylonitrile copolymer.

Materials that can be used as component A are in principle any of the styrene-acrylonitrile copolymers and α-methylstyrene-acrylonitrile copolymers known to the person skilled in the art and described in the literature or mixtures of these, insofar as the intrinsic viscosity IV of mixtures of these (measured in accordance with DIN 53727 at 25° C. on a 0.5% by weight solution in dimethylformamide; this measurement method also applies to all of the intrinsic viscosities IV mentioned hereinafter) is smaller than or equal to 90 ml/g.

Preferred components A are composed of from 50 to 70% by weight, preferably from 60 to 70% by weight, often from 65 to 70% by weight, in particular from 67 to 69.9% by weight, of styrene, and from 30 to 50% by weight, preferably from 30 to 40% by weight, often from 30 to 35% by weight, in particular from 30 to 32.9% by weight, of acrylonitrile, and also from 0 to 20% by weight, preferably from 0 to 10% by weight, often from 0 to 5% by weight, in particular from 0.1 to 3% by weight of other monomers, where the % by weight values are in each case based on the weight of component A and give a total of 100% by weight.

Components A to which preference is further given are composed of from 50 to 70% by weight, preferably from 60 to 70% by weight, often from 65 to 70% by weight, in particular from 67 to 69.9% by weight, of α-methylstyrene, and from 30 to 50% by weight, preferably from 30 to 40% by weight, often from 30 to 35% by weight, in particular from 30 to 32.9% by weight, of acrylonitrile, and also from 0 to 20% by weight, preferably from 0 to 10% by weight, often from 0 to 5% by weight, in particular from 0.1 to 3% by weight of other monomers, where the % by weight values are in each case based on the weight of component A and give a total of 100% by weight.

Components A to which preference is likewise given are mixtures of these styrene-acrylonitrile copolymers and α-methylstyrene-acrylonitrile copolymers with one another or with polymethyl methacrylate. The polymethyl methacrylate here can comprise from 0 to 10% by weight of alkyl or arylmethacrylate. However, the quantity of acrylonitrile comprised according to the invention is at least 30% by weight, based on component A.

Materials that can be used as other monomers are any copolymerizable monomers, for example p-methylstyrene, t-butylstyrene, vinylnaphthalene, alkyl acrylates and/or alkyl methacrylates, for example those having C1- to C8-alkyl moieties, N-phenylmaleimide, and mixtures of these.

According to the invention, the term molecular weight (Mw) can be interpreted in the widest sense as the mass of a molecule or a region of a molecule (e.g. a polymer strand, a block polymer or a small molecule), which can be stated in g/mol (Da) and kg/mol (kDa). The molecular weight (Mw) is preferably the weight average which can be determined by way of the methods known in the prior art.

The molecular weight Mw of component A is preferably from 60 000 to 400 000 g/mol, particularly preferably from 80 000 to 350 000 g/mol, where Mw can be determined via light scattering in tetrahydrofuran (GPC with UV detector). The molecular weight Mw of the thermoplastic molding compositions A can vary within a range of +/−20%. It is preferable that component A comprises a styrene copolymer which has been modified via a chemically reactive functionality and which, except in respect of the addition of the monomers A-I, is in essence composed of the same monomers as the "normal styrene copolymer", the differences being as follows: monomer content +/−5%, molecular weight +1-20%, and melt flow index (determined at a temperature of 220° C. and with 10 kg load in accordance with the ISO 1133 method)+1-20%.

The styrene copolymers of component A can be produced by known methods. By way of example, they can be produced by free-radical polymerization, in particular by emulsion, suspension, solution or bulk polymerization, preference being given to solution polymerization (see GB 1472195). Preference is given to use of ethylbenzene as solvent.

Component B

The thermoplastic molding composition comprises, as component B, at least 10% by weight, generally at least 20% by weight, based on the total weight of the thermoplastic molding composition, of one or more impact-modifying graft rubbers having no olefinic double bond in the rubber phase. Component B can be an ASA copolymer. The quantity of component B present in the thermoplastic molding composition is from 10 to 80% by weight, preferably from 15 to 70% by weight, particularly preferably from 14.9 to 69.9% by weight, often from 20 to 65% by weight and in particular from 24.9 to 59.9% by weight, based on the entirety of components A to D.

Component B comprises (or consists of) one or more impact-modifying graft rubbers having no olefinic double bond in the rubber phase. Preference is given to elastomeric graft copolymers of vinylaromatic compounds, in particular styrene, and to vinyl cyanides, in particular acrylonitrile, on polyalkyl acrylate rubbers. The swelling index of component B (determined by familiar methods in toluene) is generally from 6 to 20, preferably from 7 to 18 and particularly preferably from 7 to 15. The meaning of the expression "having no olefinic double bond" in this context is that no component having an olefinic double bond is used, and that component B generally comprises only from 0 to at most 0.5% by weight, preferably from 0 to 0.2% by weight, particularly preferably from 0 to 0.1% by weight, in particular from 0 to 0.01% by weight, of olefinic double bonds.

In a preferred embodiment, the elastomeric graft copolymer B is composed of:

b1) from 1 to 99% by weight, preferably from 55 to 80% by weight, in particular from 55 to 65% by weight, of a particulate graft base B1 with glass transition temperature below 0° C. (determined by familiar methods), and b2) from 1 to 99% by weight, preferably from 20 to 45% by weight, based on B, in particular from 35 to 45% by weight, of a graft shell B2 with glass transition temperature above 30° C.

Component B1 here is composed of b11) from 60 to 99.99% by weight, preferably from 80 to 99.9% by weight, in particular from 90 to 99.8% by weight, of at least one C1-8-alkyl ester of acrylic acid, preferably C4-8 alkyl acrylates, in particular n-butyl acrylate and/or 2-ethylhexyl acrylate, as component B-11, b12) from 0.01 to 40% by weight, preferably from 0.1 to 20% by weight, in particular from 0.1 to 10% by weight, of at least one polyfunctional crosslinking monomer, preferably butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, particularly preferably diallyl phthalate, allyl (meth)acrylate, in particular allyl methacrylate and/or dihydrodicyclopentadienyl acrylate ("DCPA") as component B-12, and b13) from 0 to 39.99% by weight, preferably from 0 to 19.9% by weight, in particular from 0.1 to 9.9% by weight, of hard-polymer-forming monomers, for example vinyl acetate, (meth)acrylonitrile, styrene, alkylstyrenes, preferably α-methylstyrene, and ring-alkylated styrenes, e.g. p-methylstyrene and/or tert-butylstyrene, methyl acrylate, ethyl acrylate, propyl acrylate, methyl methacrylate, ethyl methacrylate, phenylmaleimide, acrylamide, or vinyl ether such as vinyl methyl ether, as component B-13.

Component B2 here is composed of b21) from 40 to 100% by weight, preferably from 65 to 85% by weight, in particular from 70 to 80% by weight, of a vinylaromatic monomer, in particular of styrene and/or styrene derivatives, e.g. alkylstyrenes, preferably of α-methylstyrene, and ring-alkylated styrenes, e.g. of p-methylstyrene and/or of tert-butylstyrene, or of N-phenylmaleimide, as component B-21 and b22) from 0 to 60% by weight, preferably from 15 to 35% by weight, in particular from 20 to 30% by weight, of a polar copolymerizable ethylenically unsaturated monomer, in particular of acrylonitrile, or of mixtures of acrylonitrile with (meth)acrylate, of methacrylonitrile, and/or of acrylamide, as component B-22.

Component B2 can moreover comprise from 0 to 30% by weight, preferably from 0 to 20% by weight, of acrylic acid, methacrylic acid, maleic anhydride, methacrylonitrile, methyl acrylate, ethyl acrylate, propyl acrylate, methyl methacrylate, ethyl methacrylate, phenylmaleimide, acrylamide and/or vinyl methyl ether, as component B-23.

Component B is a graft copolymer comprising a graft base B1 and at least one graft shell B2. The graft copolymer B can have a near-perfectly developed core-shell structure (graft base B1 being the core, the graft shell B2 being the shell). However, it is also possible that the graft shell B2 provides only incomplete enclosure of, or covering of, the graft base B1, or else that the graft shell B2 penetrates through or into the graft base B1.

In an embodiment of the invention, the graft base B1 can comprise what is known as a core, which can be formed from a soft elastomeric polymer or from a hard polymer. In the embodiments in which the graft base B1 comprises a core, the core is preferably formed from a hard polymer, in particular polystyrene or a styrene copolymer. These graft cores and production thereof are known to the person skilled in the art and are described by way of example in EP-A 535456 and EP-A 534212.

It is also possible to use two or more graft bases B1 which differ from one another by way of example in their composition or in particle size. These mixtures of different graft bases can be produced by methods known per se to the person skilled in the art, for example in that two or more rubber lattices are produced separately and the corresponding dispersions are mixed, the moist rubbers are precipitated separately from the corresponding dispersions and by way of example mixed in an extruder, or work-up of the corresponding dispersions is completed separately and the resultant graft bases are then mixed.

Between the graft base B1 and the graft shell B2, the graft copolymer B can have one or more further graft shells, for example with other monomer compositions. However, it is preferable that the graft copolymer B has no further graft shells other than the graft shell B2.

The glass transition temperature of the polymer of the graft base B1 is usually below 0° C., preferably below (−20°) C., in particular below (−30°) C. The glass transition temperature of a polymer made of the monomers forming the graft shell B2 is usually above 30° C., in particular above 50° C. (in each case determined in accordance with DIN 53765).

The median particle size d50 of the graft copolymers B is usually from 50 to 1500 nm, preferably from 50 to 1200 nm, often from 50 to 800 nm, particularly preferably from 50 to 600 nm. These particle sizes can be achieved when particles of median size d50 from 50 to 1000 nm, preferably from 50 to 700 nm, particularly preferably from 50 to 500 nm (measured by way of example by means of ultracentrifuge), are used as graft base B1.

In an embodiment of the invention, the particle size distribution is monomodal. In another embodiment of the invention, the particle size distribution of component B is bimodal, where the median particle size of from 60 to 90% by weight is from 50 to 200 nm and the median particle size of from 10 to 40% by weight is from 200 to 800 nm, based on the total weight of component B. The sizes stated as median particle size or as particle size distribution are those determined from the cumulative mass distribution. These median particle sizes, and the other median particle sizes mentioned for the purposes of the present invention are in all cases the weight-based median particle sizes, which can by way of example be measured by means of hydrodynamic chromatography (HDC) (W. Wohlleben and H. Schuch in Measurement of Particle Size Distribution of Polymer Latexes, 2010, editors: Luis M. Gugliotta and Jorge R. Vega, pp. 130-153).

Measurement of the swelling index SI, which is a measure of the extent to which a solvent can swell a partially or fully crosslinked polymer, provides a method for characterizing the crosslinking condition of crosslinked polymer particles. An example of a conventional swelling agent is methyl ethyl ketone or toluene. The SI of the graft copolymer B of the molding compositions of the invention is usually in the range SI=from 6 to 20. A preferred SI in toluene is from 7 to 18, preferably from 7 to 15.

The swelling index is determined by way of example by drying an aqueous dispersion of the graft copolymer B overnight under nitrogen on a metal sheet at 80° C. under slight vacuum (from 600 to 800 mbar). A disk of size 1 cm$^2$ is then cut out from the residual film of thickness about 2 mm and is swollen overnight in 50 ml of toluene (or methyl ethyl ketone) in a penicillin bottle. The supernatant toluene is removed by suction, and the swollen film is weighed and dried at 80° C. overnight. The weight of the dried film is determined. The swelling index is obtained by dividing the weight of the swollen gel by that of the dried gel.

The graft copolymers B can be produced by graft polymerization of components B-21 and B-22 onto at least one of the graft bases B1 listed above. Suitable production processes for graft copolymers B are emulsion, solution, bulk and suspension polymerization. It is preferable that the graft copolymers B are produced by free-radical emulsion polymerization. This emulsion polymerization takes place in the presence of lattices of component B1 at temperatures of from 20 to 90° C. with use of water-soluble or oil-soluble initiators such as peroxodisulfate or benzoyl peroxide, or with the aid of redox initiators. Redox initiators are also suitable for polymerization below 20° C. Suitable polymerization processes are described in WO-A 02/10222, DE-A 2826925, DE-A 3149358 and DE-C 1260135.

The graft shell is preferably constructed in the emulsion polymerization process as described in DE-A 3227555, DE-A 3149357, DE-A 3149358, DE-A 3414118.

The defined establishment of the median particle sizes from 50 to 1200 nm is preferably achieved by the methods described in DE-C 1260135 and DE-A 2826925, and Applied Polymer Science, vol. 9 (1965), p. 2929. The use of polymers with different particle sizes is known by way of example from DE-A 2826925 and U.S. Pat. No. 5,196,480.

In the process described in DE-C 1260135, the graft base B1 is first produced in that the acrylate(s) B-11 used in an embodiment of the invention, and the compound B-12 acting as crosslinking agent and/or graft agent are polymerized, optionally together with the other monoethylenically unsaturated monomers B-13, in aqueous emulsion in a manner known per se at temperatures of from 20 to 100° C., preferably from 50 to 90° C. The conventional emulsifiers can be used, examples being alkali metal salts of alkyl- or alkylarylsulfonic acids, alkyl sulfates, fatty alcohol sulfonates, salts of higher fatty acids having from 10 to 30 carbon atoms, and resin soaps. It is preferable to use the sodium salts of alkylsulfonates or fatty acids having from 10 to 18 carbon atoms. In an embodiment, quantities used of the emulsifiers are from 0.5 to 5% by weight, in particular from 0.7 to 2% by weight, based on the monomers used in the production of the graft base B1. Operations are generally carried out at a water-to-monomer ratio by weight of from 4:1 to 0.6:1.

Polymerization initiators used are in particular the familiar persulfates, for example potassium persulfate. However, it is also possible to use redox systems. Quantities generally used of the initiators are from 0.1 to 1% by weight, based on the monomers used in the production of the graft base B1. The following materials can be used as further polymerization auxiliaries: the conventional buffer substances used to establish pHs of preferably from 6 to 9, for example sodium hydrogencarbonate and sodium pyrophosphate, and also from 0 to 3% by weight of a molecular weight regulator, examples being mercaptans, terpinols and dimeric α-methylstyrene, during the polymerization.

The precise polymerization conditions, in particular nature, method of addition of, and quantity of the emulsifier, are determined in detail within the ranges stated above in a manner such that the d50 value of the resultant latex of the crosslinked acrylate polymer B1 is in the range from 50 to 1000 nm, preferably from 50 to 700 nm, particularly preferably from 50 to 500 nm. The particle size distribution of the latex here is preferably intended to be narrow, with a polydispersity index <0.75, in accordance with W. Machtle and L. Borger, Analytical Ultracentrifugation of Polymers and Nanoparticles, (Springer, Berlin, 2006), ISBN 3-540-23432-2.

In a following step for the production of the graft polymer B, a monomer mixture made of component B-21, preferably styrene, component B-22, preferably acrylonitrile, and/or of a (meth)acrylate, and optionally of other unsaturated monomers, can be polymerized in the presence of the resultant latex of the crosslinked acrylate polymer B1 in an embodiment of the invention. The monomers B-21, B-22 and optionally other unsaturated monomers can be added here individually or in a mixture with one another. For example, it is possible to begin by grafting styrene alone, and then to graft a mixture made of styrene and acrylonitrile. This graft copolymerization onto the crosslinked acrylate polymer serving as graft base is again advantageously carried out in aqueous emulsion under the conventional conditions described above.

The same system can advantageously be used for the graft copolymerization and for the emulsion polymerization to produce the graft base B1, if necessary with addition of further emulsifier and initiator. The monomer mixture intended in an embodiment of the invention for grafting onto the base can be added to the reaction mixture all at once, batchwise in a plurality of stages—for example in order to construct a plurality of graft shells—or preferably continuously during the polymerization.

The graft copolymerization of the mixture of components B-21, B-22 and optionally other monomers in the presence of the crosslinking acrylate polymer B1 is conducted in a manner that gives a degree of grafting in the graft copolymer B of from 10 to 70% by weight, preferably from 20 to 60% by weight, in particular from 30 to 55% by weight, based on the total weight of component B. Because the graft yield during the graft copolymerization is not 100%, the quantity used of the monomer mixture made of B-21, B-22 and optionally other monomers in the graft copolymerization should advantageously be somewhat greater than that which corresponds to the desired degree of grafting.

Control of graft yield in the graft copolymerization, and therefore of the degree of grafting of the finished graft copolymer B, is familiar to the person skilled in the art and can be achieved by way of example inter alia via the metering rate of the monomers or by addition of regulator (Chauvel, Daniel, ACS Polymer Preprints 15 (1974), pp. 329 to 333). The emulsion graft copolymerization generally produces from 5 to 15% by weight, based on the graft copolymer, of free, ungrafted copolymer of components B-21, B-22 and, in appropriate circumstances, of the other monomers.

The proportion of the graft copolymer B in the polymerization product obtained in the graft copolymerization can by way of example be determined by the method described in US-A 2004/0006178.

In other embodiments of the process of the invention, the graft base B1 can be produced in the presence of seed particles and/or an agglomeration step can be carried out after the production of the graft base B1 and before the application of the graft shell B2. These two process options are known to the person skilled in the art and/or described in the literature, and are by way of example selected in order to achieve targeted adjustment of particle sizes and particle size distributions.

The d50 particle size of seed particles is generally from 10 to 200 nm, preferably from 10 to 180 nm, particularly preferably from 10 to 160 nm. It is preferable to use seed particles which have a narrow particle size distribution. Among these, particular preference is given to seed particles which have a monomodal particle size distribution.

The seed particles can in principle be composed of elastomeric-polymer-forming monomers, for example 1,4-butadiene or acrylates, or can be composed of a polymer with glass transition temperature above 0° C., preferably above 25° C. Among the preferred monomers on which these seed particles are based are vinylaromatic monomers such as styrene, ring-substituted styrenes and α-methylstyrene, preference being given among these to styrene, acrylonitrile, alkylacrylic acid, and alkyl acrylates, among these preferably n-butyl acrylate. It is also possible to use mixtures of two or more, preferably two, of the monomers mentioned. Very particular preference is given to seed particles made of polystyrene or n-butyl acrylate. The production of these seed particles is known to the person skilled in the art or can be achieved by methods known per se. The seed particles are preferably obtained via particle-forming heterogeneous polymerization processes, preferably emulsion polymerization. The seed particles are used as initial charge in the invention, and it is possible here to begin with separate production of the seed particles and work-up of same, followed by use of same. However, it is also possible to produce the seed particles and then, without prior work-up, to add the monomer mixture of B-11 and B-12 and optionally B-13 to same.

Processes for the partial or complete agglomeration of the graft base B1 are known to the person skilled in the art, or the agglomeration can be undertaken by methods known per se to the person skilled in the art (see, for example, Keppler et al. Angew. Makromol. Chemie, 2, 1968 No. 20, pp. 1 to 25). There is in principle no restriction on the agglomeration method: it is possible to use physical methods such as freeze agglomeration or pressure agglomeration.

However, it is also possible to use chemical methods to agglomerate the graft base. Among these is addition of electrolytes, for example inorganic or organic acids.

An agglomeration polymer is preferably used for the agglomeration. Examples that may be mentioned of these are polyethylene oxide polymers, polyvinyl ethers and polyvinyl alcohols. Among the suitable agglomeration polymers are moreover copolymers comprising C1- to C12-alkyl acrylates or C1- to C12-methalkyl acrylates, and polar comonomers such as acrylamide, methacrylamide, ethacrylamide, n-butylacrylamide, maleamide and (meth)acrylic acid. Said copolymers can be composed of other monomers, among which are dienes such as butadiene or isoprene, alongside the abovementioned monomers. The agglomeration polymers can have a multistage structure and can by way of example have a core/shell structure. By way of example, polyacrylates such as polyethyl acrylate can be used as core and particles made of (meth)alkyl acrylates and of the polar comonomers mentioned can be used as shell. A copolymer made of from 92 to 99% by weight of ethyl acrylate or ethyl methacrylate and from 1 to 8% by weight of (meth)acrylamide and/or (meth)acrylic acids is particularly preferred as agglomeration polymer. The agglomeration polymers are generally used in the form of a dispersion. The quantity used of the agglomeration polymers during the agglomeration is generally from 0.1 to 5% by weight, preferably from 0.5 to 3% by weight, based on 100% by weight of the graft base.

The graft copolymers B of the invention can be used in the form in which they are produced in the reaction mixture, for example as latex emulsion or latex dispersion. Alternatively, and preferably for most applications, however, they can also be worked up in a further step. Measures for the work-up are known to the person skilled in the art. Among these are by way of example isolation of the graft copolymers B from the reaction mixture, e.g. via spray drying or shear, or by precipitation using strong acids, or by means of nucleating agents such as inorganic compounds, for example magnesium sulfate. However, in another method for work-up of the graft copolymers B present in the reaction mixture, they are dewatered completely or to some extent. Equally, it is possible to achieve the work-up by means of a combination of the measures mentioned.

Component C

The thermoplastic molding composition optionally comprises, as further component C, from 0 to 20% by weight, preferably from 0 to 15% by weight, often from 0 to 10% by weight, particularly preferably from 0 to 8% by weight, often from 1 to 8% by weight, based on the entirety of components A to D, of one or more polymers differing from components A and B, as component C.

Mention may be made of the following as component C: Polycarbonate copolymers (PC), polyamide copolymers (PA), polyurethane copolymers (PUR), polyvinyl chloride copolymers (PVC), polyester copolymers, for example polyethylene terephthalate copolymers (PET), polyoxymethylene copolymers (POM), (halogenated) polyolefin copolymers, for example polypropylene (PP) or polyethylene (PE), and polyacrylonitrile-butadiene-styrene copolymers (ABS). In particular, the composition comprises a polycarbonate as component C. The production of the abovementioned copolymers is known to the person skilled in the art.

Component D

The thermoplastic molding composition optionally comprises, as further component D, from 0 to 15% by weight, preferably from 0 to 10% by weight, often from 0 to 8% by weight, particularly preferably from 0.1 to 5% by weight, based on the entirety of components A to D, of one or more additives (auxiliaries and additional substances) differing from components A to C.

Mention may be made of the following: particulate mineral fillers, processing aids, stabilizers, oxidation retarders, agents to inhibit decomposition by heat and decomposition by ultraviolet light, lubricants and mold-release agents, flame retardants, dyes and pigments, and also plasticizers.

Mention may also be made of esters as low-molecular-weight compounds. It is also possible in the present invention to use two or more of said compounds. The molecular weight of the compounds is generally smaller than 3000 g/mol, preferably smaller than 500 g/mol and in particular smaller than 150 g/mol.

Examples of particulate mineral fillers that can be used are amorphous silica, carbonates such as magnesium carbonate, calcium carbonate (chalk), powdered quartz, mica, a very wide variety of silicates such as clays, muscovite, biotite, suzoit, tin maletite, talc powder, chlorite, phlogopite, feldspar, calcium silicate such as wollastonite and kaolin, particularly calcined kaolin.

Among UV stabilizers are by way of example various substituted resorcinols, salicylates, benzotriazoles and benzophenones, quantities of these that can be used being generally up to 2% by weight. By way of example, Tinuvin® 770 (BASF) can be used.

Oxidation retarders and heat stabilizers can be added to the thermoplastic molding composition in the invention. Sterically hindered phenols, hydroquinones, substituted members of this group, secondary aromatic amines, optionally in conjunction with phosphorus-containing acids and/or salts thereof, and mixtures of these compounds, preferably in concentrations up to 1% by weight, based on the weight of the mixture, can be used.

It is moreover possible in the invention to add lubricants and mold-release agents, generally in quantities up to 1% by weight of the thermoplastic composition. Mention may be made here of stearic acid, stearyl alcohol, alkyl stearates and stearamides, preferably Irganox®, and also esters of pentaerythritol with long-chain fatty acids. It is possible to use the calcium, zinc, or aluminum salts of stearic acid, and also dialkyl ketones, for example distearyl ketone. It is moreover also possible to use ethylene oxide-propylene oxide copolymers as lubricants and mold-release agents. Natural, and also synthetic, waxes can moreover be used. Mention may be made of the following: PP waxes, PE waxes, PA waxes, grafted PO waxes, HDPE waxes, PTFE waxes, EBS waxes, Montan wax, carnauba wax and beeswaxes.

Flame retardants can be either halogen-containing or halogen-free compounds. Suitable halogen compounds, brominated compounds being preferable to the chlorinated compounds here, remain stable during the production and processing of the molding composition of the invention, and therefore no corrosive gases are liberated and there is no resultant impairment of effectiveness. It is preferable to use halogen-free compounds, for example phosphorus compounds, in particular phosphine oxides and derivatives of acids of phosphorus, and salts of acids and of acid derivatives of phosphorus. Phosphorus compounds particularly preferably comprise ester groups, alkyl groups, cycloalkyl groups and/or aryl groups. Oligomeric phosphorus compounds with molecular weight smaller than 2000 g/mol, as described by way of example in EP-A 0 363 608, are likewise suitable.

The material can moreover comprise pigments and dyes. Quantities of these comprised are generally from 0 to 15% by weight, preferably from 0.1 to 10% by weight and in particular from 0.5 to 8% by weight, based on the entirety of components A to C. The pigments for the coloring of thermoplastics are well known, see by way of example R. Gachter and H. Müller, Taschenbuch der Kunststoffadditive [Plastics additives handbook], Carl Hanser Verlag, 1983, pp. 494 to 510. White pigments may be mentioned as first preferred group of pigments, examples being zinc oxide, zinc sulfide, white lead (2 $PbCO_3.Pb(OH)_2$), lithopones, antimony white and titanium dioxide. Of the two most familiar crystalline forms of titanium dioxide (rutile and anatase), it is in particular the rutile form that is used for the white coloring of the molding compositions of the invention.

Black pigments that can be used in the invention are iron oxide black ($Fe_3O_4$), spinel black ($Cu(Cr,Fe)2O_4$), manganese black (mixture of manganese dioxide, silicon oxide and iron oxide), cobalt black and antimony black, and also particularly preferably carbon black, which is mostly used in the form of furnace black or gas black (in this connection see G. Benzing, Pigmente für Anstrichmittel [Pigments for paints], Expert-Verlag (1988), pp. 78ff). Inorganic chromatic pigments such as chromium oxide green, or organic chromatic pigments, such as azo pigments and phthalocyanines, can be used in the invention in order to achieve particular hues. Such pigments are widely obtainable commercially. It can moreover be advantageous to use the abovementioned pigments and/or dyes in a mixture, an example being carbon black with copper phthalocyanines, because this generally facilitates the color dispersion in the thermoplastics.

The mixing of components A and B and, if used, components C and D to produce the molding composition can be achieved in any known manner by any of the known methods. If, by way of example, said components have been produced by emulsion polymerization, a possibility is mixing of the resultant polymer dispersions with one another followed by precipitation of the polymers together and work-up of the polymer mixture. However, the blending of said components is preferably achieved by extruding, kneading, roll-milling the components together, where the components have, insofar as is necessary, been isolated in advance from the solution or aqueous dispersion obtained during the polymerization. The graft-copolymerization products B, obtained in aqueous dispersion, can also be only partially dewatered and mixed in the form of moist crumb with the hard matrix A, whereupon then the complete drying of the graft copolymers B takes place during the mixing procedure.

The thermoplastic molding composition is preferably produced by a process comprising (or consisting of) the following steps:
i) mixing of components A and B, and optionally of component(s) C and/or D,
ii) compounding of the components mixed in step i), and
iii) cooling and optionally further process steps.

Any of the extruders known to the person skilled in the art is suitable for the mixing of components A and B, and optionally of component(s) C and/or D.

The mixing is preferably achieved in a twin-screw extruder. However, it is also possible to use an extruder with three or more screws, or else an extruder with a large-diameter main screw and small screws arranged around same (planetary arrangement). The screws of the extruder moreover preferably corotate. However, counter-rotation is also possible. It is particularly preferable to use a twin-screw extruder with corotating screws.

The screw-based machine preferably comprises at least one vent. The number, arrangement and design of the vents generally depends on the quantity of the gas intended to be discharged from the screw-based machine.

By way of example, in the case of extrusion of thermoplastics comprising water, the number, arrangement and geometry of the vents depends on the water content of the thermoplastic and on the desired residual water content of the final product.

The conventional process steps can be used for the production of the moldings, films or coatings. By way of example, a cold forming procedure can be used to obtain a molding. In another possibility, after step (ii), the thermoplastic molding composition is not completely cooled before being further processed.

The residual acrylonitrile monomer content of the thermoplastic molding composition of the invention is smaller than 100 ppm, preferably smaller than 80 ppm, often smaller than 75 ppm, in particular smaller than 65 ppm and very particularly preferably smaller than 55 ppm.

The residual monomer content of the thermoplastic molding composition in the invention is smaller at least by 5%, often by at least 8%, preferably by at least 10%, than in the case of thermoplastic molding compositions which have identical acrylonitrile content in components A (hard matrix) and B2 (graft shell). The thermoplastic molding composition is particularly suitable for the production of moldings, films and coatings.

The invention is described in more detail in the examples and claims below.

EXAMPLES

Notched impact resistance ($a_k$) was measured in accordance with ISO 179 1eA (2001) at 23° C.

Intrinsic viscosity (IV) is measured in accordance with DIN 53727 (1980) at 25° C. on a 0.5% by weight solution in dimethylformamide.

Residual monomer content was determined by chromatographic methods.

The thermoplastic molding compositions were produced in a Werner & Pfleiderer ZDSK 30 twin-screw extruder.

The ASA rubber and the SAN polymer were produced as described in EP-B 1400337. The quantity of rubber here is based on the dry rubber.

a) Production of the Hard Matrix A

The SAN matrix polymers were produced by continuous solution polymerization in a 100 l tank with evaporative cooling. Table 2a collates the feed composition and the production process data.

b) Production of the Graft Rubbers B b1) Small-Particle Graft Base

|  | Material | Quantity (g) |
|---|---|---|
| Initial charge | Demineralized water | 2774 |
|  | Sodium bicarbonate | 7.0 |
|  | Potassium persulfate | 5.5 |
|  | K30 (40% by wt. in water) | 46 |
| Feed | n-Butyl acrylate | 1800 |
|  | DCPA | 36.7 |
| Total |  | 4669.2 |
| Total monomers |  | 1836.7 |
| Solids content (100% conversion) |  | 40% |

Procedure:

Use demineralized water and the soap (K30, see Houben-Weyl, 1962) as initial charge and heat to 60° C. at 100 rpm. Add sodium hydrogencarbonate and potassium persulfate. The feed is composed of 98% of n-butyl acrylate and 2% of dicyclopentadienyl acrylate (DCPA). Start feed and add within 3.5 hours. Continue polymerization for a further 2 hours and allow to cool.

b2) Small-Particle Graft Rubber B-i

| Graft stage | Starting materials | Quantity |
|---|---|---|
| Initial charge | Graft base (39.6%) | 4610.00 g (=1825.56 g of solids) |
|  | Demineralized water | 2832.65 g |
| Addition 1 | Potassium persulfate | 5.48 g |
| Feed 1 | Styrene | 912.78 g |
|  | Acrylonitrile | 304.26 g |
|  | Total monomer feed: | 1217.04 g |
|  | Initial monomer charge: | 253.55 g |
|  | Residual feed: | 963.49 g |
| Total graft monomers: |  | 1217.04 g |
| Degree of grafting: |  | 40% |
| Total quantity: |  | 8726.24 g |

| Graft stage | Starting materials | Quantity |
|---|---|---|
| Total solids: |  | 3054.18 g |
| Theoretical solids content: |  | 35.00% |

Use graft base and demineralized water as initial charge in the 10 l flask of the system and heat to 60° C. at 100 rpm. Increase stirrer rotation rate to 235 rpm and add addition 1 (PPS). Add 10/48 parts of the total feed (acrylonitrile/styrene, 25:75 parts) as initial monomer charge within 20 minutes. Add the remainder of the feed within 2.5 hours. Decrease stirrer rotation rate to 200 rpm and continue polymerization for a further 2 hours at 65° C.

b3) Large-Particle Base Rubber

| Graft base | Starting materials | Quantity |
|---|---|---|
| Initial charge | Demineralized water: | 2301.37 g |
|  | LS 200/0 (39.5%): | 23.93 g |
|  | Sodium bicarbonate: | 7.18 g |
|  | Potassium persulfate: | 5.67 g |
| Feed 1 | n-Butyl acrylate: | 1852.20 g |
|  | DCPA: | 37.80 g |
|  | Total feed: | 1890.00 g |
| Feed 2 | K30 (40%): | 28.35 g |
|  | Demineralized water: | 468.50 g |
|  | Total feed: | 496.85 g |
| Total monomers |  | 1890.00 g |
| Total quantity: |  | 4725.00 g |
| Total solids: |  | 1890.00 g |
| Theoretical solids content: |  | 40.00 |

Use demineralized water and graft base b1) as initial charge with exclusion of oxygen, and heat to 60° C. with stirring. Add sodium hydrogencarbonate and potassium persulfate.

Feed 1 is composed of 98% of n-butyl acrylate and 2% of DCPA (dicyclopentadienyl acrylate); feed 2 is composed of Na-C12-sulfonate (K30) soap and demineralized water. Begin feed 1 and 2 and add within 3.5 hours. After end of feed, heat to 65° C. and continue polymerization for a further 2 hours.

B4) Large-Particle Graft Rubber B-ii

| Graft stage | Starting materials | Quantity |
|---|---|---|
| Initial charge | Graft base (40.3%): | 4675.00 g |
|  | Demineralized water: | 3006.01 g |
|  | K30 (40%): | 8.48 g |
| Addition 1 | Potassium persulfate: | 5.02 g |
| Feed 1 | Styrene: | 408.21 g |
|  | Total monomer in feed 1: | 408.21 g |
| Feed 2 | Styrene: | 635.86 g |
|  | Acrylonitrile: | 211.95 g |
|  | Total monomer in feed 2: | 847.81 g |
| Total graft monomers: |  | 1256.02 g |
| Degree of grafting: |  | 40% |
| Total quantity: |  | 9013.62 g |
| Total solids: |  | 3154.77 g |
| Theoretical solids content: |  | 35.00% |

Use graft base and demineralized water as initial charge in the 10 l flask, and heat to 60° C. Increase stirrer rotation rate to 235 rpm and add K30 and addition 1 (PPS). Add feed 1 (styrene) within one hour, and continue polymerization for a further 30 minutes. Add feed 2 (styrene/acrylonitrile, 75:25) within 2 hours. Decrease stirrer rotation rate to 200 rpm and continue polymerization for a further 2 hours at 60° C.

c) Production of the Thermoplastic Compositions

The graft rubbers B were isolated by precipitation with aqueous $MgSO_4$ and dried in vacuo at 60° C. as far as about 2% residual moisture content.

The graft rubbers (components B-i and B-ii) were blended with the SAN copolymers (component A) listed in table 2 in a ZDSK 30 system at 250° C. The mixtures comprised in each case 40% by weight of B and 60% by weight of A.

Corresponding ASA compositions can be produced with 0.5 part by weight of stabilizer (for example Tinuvin® 770), and tested.

TABLE 1a

Mixtures of components A 3 with component B-i in a ratio by weight of 60:40 at 250° C.

| No. | S/AN ratio in graft shell of component B-i | Delta AN (matrix-graft shell) | Delta $a_k$ in relation to standard* | Residual AN monomers (ppm) |
|---|---|---|---|---|
| 1 (comp.) | 65/35 | 1 | 0 | 50 |
| 2 | 70/30 | 6 | +2 | 40 |
| 3 | 73/27 | 9 | +5 | 40 |
| 4 | 75/25 | 11 | +2 | 30 |
| 5 (comp.) | 80/20 | 15 | −5 | 25 |

Table 1a shows that when the thermoplastic molding compositions of the invention (mixtures 2 to 4) are compared with the thermoplastic molding composition 1 (comp.), which has an identical acrylonitrile content of hard matrix A and graft shell B2 (delta AN=0), the former have reduced residual acrylonitrile monomer content. Although the thermoplastic molding composition 5 (comp.), which has delta AN equal to 15, has a reduced residual monomer content, this molding composition suffers significant loss of mechanical properties, represented here by the notched impact resistance ($a_k$).

TABLE 1b

Mixtures of components A 4 (S/AN 64/36) with component B-i in a ratio by weight of 60:40 at 250° C.

| No. | S/AN ratio in graft shell of component B-ii | Delta AN (matrix-graft shell) | Delta $a_k$ in relation to standard* | Residual AN monomers (ppm) |
|---|---|---|---|---|
| 6 (comp.) | 65/35 | 0 | 0 | 70 |
| 7 | 70/30 | 6 | 0 | 50 |
| 8 | 73/27 | 9 | 0 | 45 |
| 9 | 75/25 | 10 | 0 | 45 |
| 10 (comp.) | 80/20 | 15 | −3 | 35 |

Table 1 b shows that when the thermoplastic molding compositions of the invention (mixtures 7 to 9) are compared with the thermoplastic molding composition 6 (comp.), which has an identical acrylonitrile content of hard matrix A and graft shell B2 (delta AN=0), the former have reduced residual acrylonitrile monomer content. Although the thermoplastic molding composition 10 (comp.), which has delta AN equal to 15, has a reduced residual monomer content, this molding composition suffers significant loss of mechanical properties, represented here by the notched impact resistance.

TABLE 2a

Production and properties of the styrene-acrylonitrile copolymers (SAN) (component A):

| | No. | | | |
|---|---|---|---|---|
| Feed [% by wt.] | A1 (comp.) | A2 (comp.) | A3 | A4 |
| Styrene | 65.6 | 55.9 | 48.9 | 43.9 |
| Acrylonitrile | 14.4 | 19.1 | 24.1 | 28.0 |
| Ethylbenzene | 20.0 | 25.0 | 27.0 | 28.1 |
| Polymerization temperature [° C.] | 140.5 | 141 | 142 | 141 |
| Residence time [h] | 4.0 | 3.96 | 3.83 | 3.67 |
| STY [kg/l*h] | 0.116 | 0.109 | 0.118 | 0.118 |
| AN content in polymer [% by wt.] | 20 | 25 | 30 | 35.9 |
| IV [ml/g] | 80 | 80 | 80 | 80 |

AN content in the polymer [% by weight] was determined by FT-IR on KBr pressings.
STY = space-time yield Corresponding results can also be observed from ASA compositions with further polymer C (for example polycarbonate) and/or additives.

What is claimed is:

1. A thermoplastic molding composition comprising, based on the entirety of components A to D:
   a) from 20 to 90% by weight of one or more styrene copolymers as component A, composed of styrene and at least 30% by weight of acrylonitrile, based on component A,
   b) from 10 to 80% by weight of one or more impact-modifying graft rubbers having a rubber phase with no olefinic double bond as component B, composed of at least one graft base B1 and of at least one acrylonitrile-containing graft shell B2,
   c) from 0 to 20% by weight of a polymer as component C different from components A and B, and
   d) from 0 to 15% by weight of additive as component D,
   where component A and graft shell B2 each have an acrylonitrile content, and the acrylonitrile content of component A is at least 5% by weight and at most 10% by weight higher than the acrylonitrile content of graft shell B2,
   where the thermoplastic molding composition has a residual acrylonitrile monomer content that is smaller than 100 ppm,
   where the residual acrylonitrile monomer content in the thermoplastic molding composition is smaller by at least 10% in comparison to the residual acrylonitrile monomer in comparable thermoplastic molding compositions which have identical acrylonitrile content in components A and B2.

2. The thermoplastic molding composition of claim 1, in which component A is a styrene-acrylonitrile copolymer, a a-methylstyrene-acrylonitrile copolymer, or a combination thereof and the residual acrylonitrile monomer content in the thermoplastic molding composition is smaller than 75 ppm.

3. The thermoplastic molding composition of claim 1, where component A is a styrene-acrylonitrile copolymer with from 30 to 35% by weight acrylonitrile content and from 65 to 70% by weight styrene content.

4. The thermoplastic molding composition of claim 1, where component B is composed of:
   b1) from 55 to 80% by weight of a particulate graft base B1 with glass transition temperature below 0° C., and
   b2) from 20 to 45% by weight of a graft shell B2.

5. The thermoplastic molding composition of claim 1, where graft base (component B1) is composed of:
   b11) from 80 to 99.9% by weight of at least one C1-8-alkyl ester of acrylic acid as component B-11, b12) from 0.1 to 5% by weight of at least one polyfunctional crosslinking monomer selected from the group consisting of butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate, dihydrodicyclopentadienyl acrylate, and combinations thereof, as component B-12, and optionally b13) from 0 to 19.9% by weight of monomers selected from the group consisting of vinyl acetate, (meth)acrylonitrile, styrene, methylstyrene, methyl methacrylate, and vinyl ether, as component B-13.

6. The thermoplastic molding composition of claim 1, where the graft shell (component B2) is composed of:
   b21) from 65 to 85% by weight of an aromatic monomer selected from the group consisting of styrene, a-methylstyrene, and N-phenylmaleimide, as component B-21, and
   b22) from 15 to 35% by weight of acrylonitrile as component B-22.

7. The thermoplastic molding composition of claim 1, consisting of:
   a) from 30 to 85% by weight of component A,
   b) from 14.9 to 69.9% by weight of component B,
   c) from 0 to 15% by weight of component C, and
   d) from 0.1 to 5% by weight of component D.

8. The thermoplastic molding composition of claim 1, where the median particle diameter of component B is from 0.05 to 1.5 μm.

9. The thermoplastic molding composition of claim 1, where the median particle diameter of component B is from 1.6 to 20 μm.

10. A process for the production of a thermoplastic molding composition of claim 1, comprising the following steps:
   i) mixing of components A and B, and optionally of component(s) C or D or a combination of C and D,
   ii) compounding of the components mixed in step i), and
   iii) cooling and optionally further process steps.

11. A process of preparing moldings, films, or coatings from the thermoplastic molding composition of claim 1.

12. The thermoplastic molding composition of claim 1, where the residual acrylonitrile monomer content in the thermoplastic molding composition is smaller than 80 ppm.

13. The thermoplastic molding composition of claim 1, where component B is composed of:
   b1) from 55 to 65% by weight of a particulate graft base B1 with glass transition temperature below 0° C., and
   b2) from 35 to 45% by weight of a graft shell B2.

14. The thermoplastic molding composition of claim 1, where graft base (component B1) is composed of:
   b11) from 80 to 99.9% by weight of at least one C4-8 alkyl acrylates as component B-11,
   b12) from 0.1 to 5% by weight of at least one polyfunctional crosslinking monomer selected from the group consisting of butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate, dihydrodicyclopentadienyl acrylate, and combinations thereof, as component B-12, and optionally
   b13) from 0 to 19.9% by weight of monomers selected from group consisting of vinyl acetate, (meth)acrylonitrile, styrene, methylstyrene, methyl methacrylate and vinyl ether, as component B-13.

15. The thermoplastic molding composition of claim 1, where graft base (component B1) is composed of:
   b11) from 80 to 99.9% by weight of at least one n-butyl acrylate, 2-ethylhexyl acrylate, or a mixture thereof, as component B-11,
   b12) from 0.1 to 5% by weight of at least one polyfunctional crosslinking monomer selected from the group consisting of butylene diacrylate, divinylbenzene, butanediol dimethacrylate, trimethylolpropane tri(meth)acrylate, diallyl methacrylate, diallyl maleate, diallyl fumarate, triallyl methacrylate, triallyl isocyanurate, diallyl phthalate, allyl methacrylate, dihydrodicyclopentadienyl acrylate, and combinations thereof, as component B-12, and optionally
   b13) from 0 to 19.9% by weight of monomers selected from the group consisting of vinyl acetate, (meth)acrylonitrile, styrene, methylstyrene, methyl methacrylate, and vinyl ether, as component B-13.

16. A process of preparing moldings, films, or coatings from the thermoplastic molding composition produced by the process of claim 10.

17. The thermoplastic molding composition of claim 1, wherein the notched impact strength of the thermoplastic molding composition remains substantially the same in comparison to the notched impact strength of comparable thermoplastic molding compositions which have identical acrylonitrile content in components A and B2.

* * * * *